United States Patent [19]

Bate et al.

[11] 3,718,776

[45] Feb. 27, 1973

[54] MULTI-TRACK OVERLAPPED-GAP MAGNETIC HEAD, ASSEMBLY

[75] Inventors: Geoffrey Bate; Robert H. Echelmeier, both of Boulder; Larry H. Everett; William D. Kehr, both of Longmont; Joseph E. Schaps, Boulder; Gerald Taylor, Longmont; Richard F. M. Thornley, Boulder, all of Colo.

[73] Assignee: International Business Machines Corporation, Armonk, N.Y.

[22] Filed: Dec. 11, 1970

[21] Appl. No.: 97,208

[52] U.S. Cl...........179/100.2 C, 29/603, 340/174.1 F

[51] Int. Cl...............................................G11b 5/16

[58] Field of Search..........179/100.2 C; 340/174.1 F; 346/74 MC; 29/603

[56] References Cited

UNITED STATES PATENTS

| | | | |
|---|---|---|---|
| 2,852,617 | 9/1958 | Thiele | 179/100.2 C |
| 3,373,416 | 3/1968 | Guerst et al. | 179/100.2 C |
| 3,577,191 | 5/1971 | Haertlein | 179/100.2 C |
| 3,344,237 | 9/1967 | Gregg | 179/100.2 C |
| 3,633,274 | 1/1972 | Miyata | 179/100.2 C |

OTHER PUBLICATIONS

Electronics Magazine, Vol. 26, Issue 7, p. 150, 151, July 1953 "Improving Response of Mag. Pb. Heads," Arthur H. Mankin IBM Tech Disc. Bull. Vol. 13 No. 6 11/70 p. 1547 "-Mag. Head Structure," Siege IBM Tech. Disc. Bull. Vol. 8 No. 2 July 1965, p. 257 "Mag. Rec. Head," McClung

*Primary Examiner*—Vincent P. Canney
*Assistant Examiner*—Jay P. Lucas
*Attorney*—Hanifin & Jancin and Gunter A. Hauptman

[57] ABSTRACT

A magnetic head reads and writes a plurality of information tracks, recorded as magnetization patterns on a magnetic recording medium, with two magnetic sheets mounted in a supporting frame. Complementary sheets each define a number of alternating three-sided and two-sided figures aligned along a subsequently formed head face. A gap-forming non-magnetic material is placed along one leg of each figure on one of the sheets, and the sheets are placed together, welded, encapsulated and ground to form a head. Preformed windings slip over one leg of each of the three-sided figures and preformed shielding cans surround the magnetic elements.

10 Claims, 11 Drawing Figures

INVENTORS
GEOFFREY BATE
ROBERT H. ECHELMEIER
LARRY H. EVERETT
WILLIAM D. KEHR
JOSEPH E. SCHAPS
GERALD TAYLOR
RICHARD F. M. THORNLEY

BY Gunter A. Hauptman
ATTORNEY

MULTI-TRACK OVERLAPPED-GAP MAGNETIC HEAD, ASSEMBLY

BACKGROUND OF THE INVENTION

1. Field of the Invention

The invention relates to electronic data processing and, more particularly, to magnetic transducers for converting between electric signals and magnetic indicia recorded on a medium.

2. Description of the Prior Art

In electronic data processing systems, the density of information that must be stored on a magnetic recording medium, such as magnetic drums, tapes, or discs, continually increases. The discrete magnetized portions on the medium have thus become very small and closely spaced with sharp transitions at their boundaries. For example, the recording densities (in flux reversals per inch), relative recording velocities (in inches per second), and track width (in milli-inches) of existing systems are:

| | Density (Fri) | Velocity (ips) | Track Width (mils) |
|---|---|---|---|
| Audio | ≈20,000 | 1-7/8, 15/16 | 35 |
| Video | ≈20,000 | 1000 | 6 |
| Computer Disk | 4,040 | 1000 | 4.5 |
| Computer Tape | 3,200 | 200 | 40 |

In comparison, current technical literature speaks of future computer tape densities, velocities, and widths approaching 50,000 Fri; 2,000 ips; and 1 mil.

Magnetic heads for existing system are constructed by a large number of precision techniques which accurately form magnetic gaps having sizes determined primarily by the bit density. For example, a typical head gap for computer tape is 90 $\mu$-inches. A head designed for a bit density of 50,000 Fri will require a gap of 20 $\mu$-inches, which is extremely difficult to accurately form using existing production techniques, wherein the gap is defined by two abutting materials. Gap formation is greatly simplified by forming the gap between two overlapped materials, a non-magnetic spacing defining the gap dimension. For example, in prior art overlapped single-track magnetic heads, two thick ferromagnetic plates positioned side-by-side are spaced from each other by a non-magnetic foil having the thickness of the desired gap. Such single-track heads are not adaptable to high density multi-track recording because the spacing of a plurality of adjacent heads must be too great and cannot be accurately determined. One solution to the multi-track problem suggested in the prior art includes stacking pairs of plates in a sandwich. This, however, creates inter-track shielding problems and limits the minimum track spacing to the winding diameter. Another prior art solution avoids the shielding problem by assembling the head from a single strip insulated on one side and having tabs, one for each track, bent back onto the strip. However, the winding diameter limits the minimum inter-track spacing, and the single continuous strip creates cross-talk problems.

SUMMARY OF THE INVENTION

The multi-track magnetic head of this invention is formed from two magnetic layers which are processed to form spaced individual elements. Each element is a complete magnetic circuit with an accurately defined gap. The elements are accurately spaced relative to each other along a line, each with its winding parallel to the line to permit close spacing.

Each layer has an active head element section, a support section, and a removable section aiding in initial assembly. The layer comprises a sheet of high-permeability magnetic material, such as permalloy or molybdenum-permalloy, thick enough to be self-supporting, or deposited on a supporting substrate, etc. Each layer is formed to provide a line of alternating three-legged and two-legged members placed along the boundary of the active section and the removable section. The layers are complementary so that, when mated, each three-legged member is juxtaposed with a two-legged member to form a complete magnetic circuit. Prior to mating, the legs along the boundary of one layer are coated with a non-magnetic film (or a non-magnetic layer is placed thereon, etc.) to define the gap between overlapping complementary two- and three-legged members of opposing layers. Prewound coils are slipped over the leg of each three-legged member opposite the boundary. The layers are then mated, overlapping corners of one of the legs on each layer for each element being fastened, by welding for instance, to complete the magnetic circuit; and, a shield can may be slipped over each coil. The entire head may then be mounted in a holder, with other such heads, if desired, encapsulated to form a physical bond and the removable section ground away to expose the gaps.

The foregoing and other features and advantages of the invention will be apparent from the following more particular description of preferred embodiments of the invention, as illustrated in the accompanying drawings.

DETAILED DESCRIPTION OF THE PREFERRED EMBODIMENTS

Figure 1A:
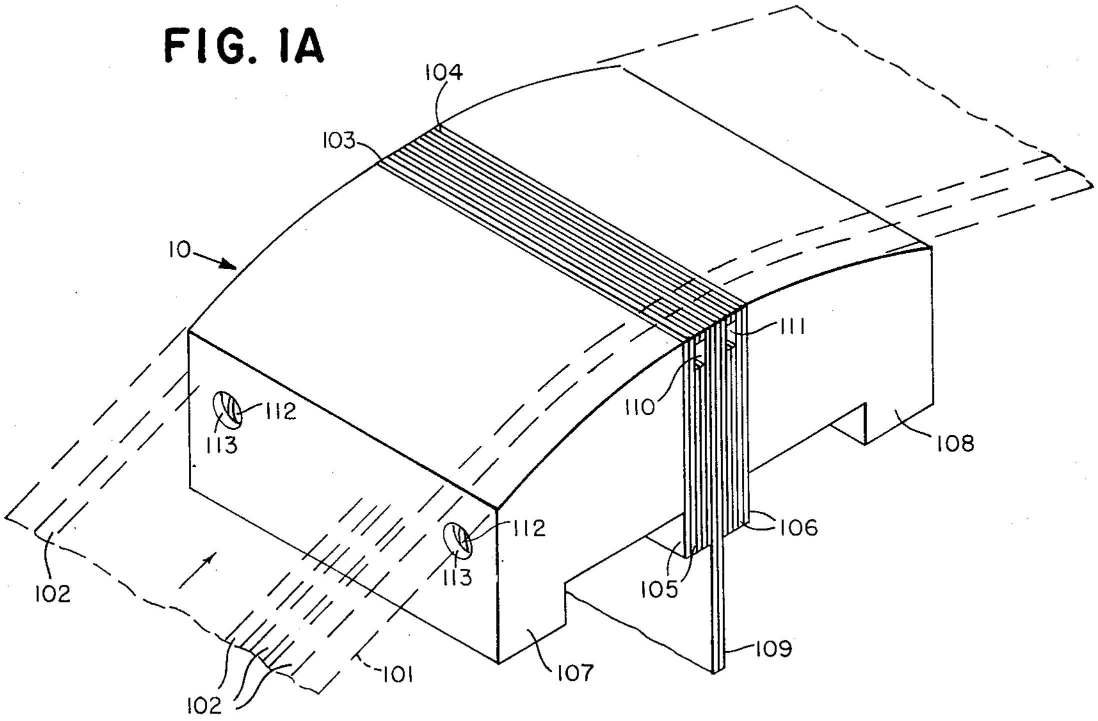
FIG. 1A is a perspective view of a magnetic tape head incorporating the invention.

Referring to FIG. 1A, there is shown a multi-track magnetic tape head 10 for recording and reading information stored as appropriately magnetized areas on tracks 102 of a tape 101 moving in the direction of the arrow. Tape movement in the direction shown is illustrative only; any relative motion between the head and tape being possible. The tape head 10 has a curved surface over which the tape 101 passes to bring successive rows across tracks 102 past write gap 103 and read gap 104. Information is written, one row at a time, as magnetic indicia on the tape by a magnetic field formed for each track across the write gap 103. Magnetic indicia recorded as magnetic field are, in turn, detected as electrical signals across read coils. The write gap 103 is defined by the spacing between two magnetic layers 105, and the read gap 104 is similarly defined by layers 106. The layers are mounted in a supporting housing having a center section shield 109, with winding slots 110 and 111, a write housing 107 and read housing 108. Aligning holes 113 through the entire housing receive aligning dowel bolts 112 to fasten the head together.

The write gap 103 and its magnetic layers 105 and the read gap 104 and its magnetic layers 106 form write and read sections, respectively. When the write and read sections are placed between the center section shield 109 and the housings 107 and 108, the center section shield 109 establishes a desired separation between the centers of the write gap 103 and read gap 104 while simultaneously providing electromagnetic screening between the head's writing and reading elements, to be described hereinafter. A typical separation between the write gap 103 and read gap 104 may be 150 mils. The center section shield 109 may be either a solid structure or laminated; typical materials including primarily "conductive" materials, such as copper or brass (hereinafter called conductive) and primarily "-magnetic" materials, such as molybdenum permalloy (hereinafter called magnetic). If the center section shield 109 is solid, a conductive material is typically chosen and, if it is laminated, alternating layers of a conductive and magnetic material are chosen. The write housing 107 and read housing 108 protect the magnetic elements from damage and provide a suitable path by which the tape 101 approaches and leaves the gaps 103 and 104. The housings 107 and 108 may be made of any suitable solid or laminated metallic or non-metallic material, brass being typical for solid housings.

Figure 1B:
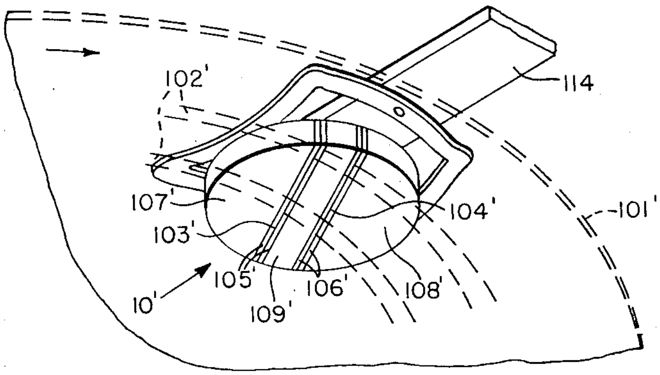
FIG. 1B is a perspective view of a magnetic disc head incorporating the invention.

FIG. 1B shows a magnetic disc head 10′ serving the same purpose as the magnetic tape head 10 but used for recording and reading information magnetically stored on tracks 102′ of a rotating disc 101′. As described above, any relative motion is acceptable. The write gap 103′ is defined by layers 105′ and the read gap 104′ is defined by layers 106′. Read and write sections, each formed by a gap and two layers, are sandwiched between a center section shield 109′, write housing 107′ and read housing 108′. The entire head structure is supported by an arm 114. The disc head 10′ is designed to "float" or "fly" above the surface of the disc 101′, and index across the disc 101′ to read all tracks 102′ as desired. While the head 10′ is usually placed to access a plurality of tracks in parallel, it may be used to access information sequentially along one track. The construction details of the disc head 10′, otherwise similar to that of the tape head 10, are particularly useful in lightening the head 10′ for flying. Subsequent descriptions refer equally to heads 10 and 10′.

Figure 2:
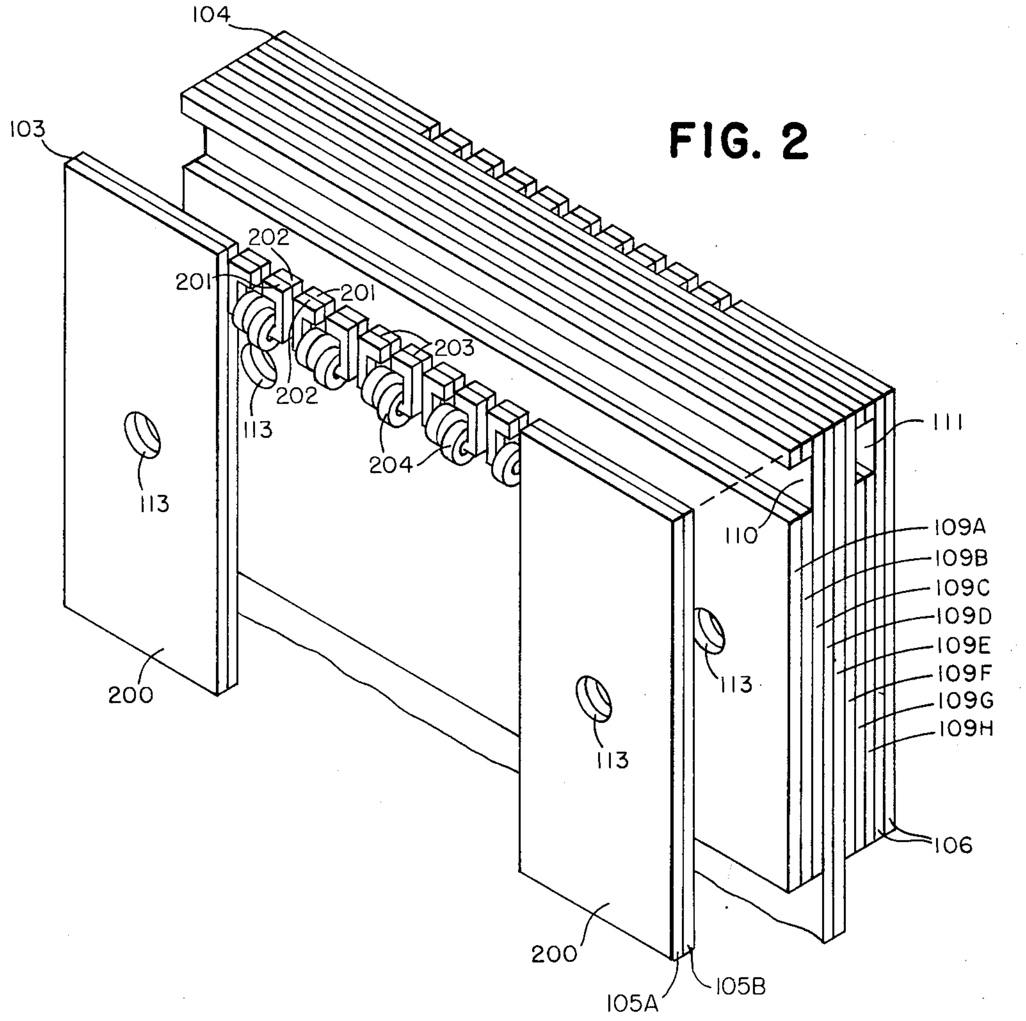
FIG. 2 is a perspective view showing internal details of a head.

Referring now to FIG. 2, details of the write section comprising the write gap 103 and layers 105A and 105B will be explained. The read section, comprising read gap 104 and layers 106 is similar in construction and may embody the same principles of design. The layers 105 and 106 may comprise any suitable sheet, lamination, etc., as will be described below. The write section comprises supports 200 and nine write elements, each consisting of a "C" element 201 and "L" element 202 pair, all formed from two layers. While nine write elements are shown for writing nine tracks on a magnetic tape, any number of write elements may be provided. Further, it is not necessary that the number or size of write elements and read elements be identical. "C" elements 201 are three-legged layer portions shaped as backward letter "C's." "L" elements 202 are two-legged layer portions shaped as upside-down letter "L's." Windings 204 are retained on the bottom leg of each "C" element 201 and prevented from sliding off the leg by the side leg of the corresponding "L" element 202. Each pair of "C" and "L" elements defines a write gap 203. All the write elements and supports are held in place by clamping them between housings and by encapsulation or other appropriate means, to be explained later. Also, as will be explained, the windings 204 are covered by screening cans. The layers 105A and 105B are located relative to the center section shield 109 by aligning fasteners passed through aligning holes 113. The center section shield is, in this example, constructed of a plurality of laminations 109A, 109B, 109C, etc.

The windings 204 are placed on the "C" elements along an axis parallel to a line through the write gaps 203, which line is 90° from the normal winding position in conventional heads. The nine elements for each of nine tracks in the magnetic head of FIG. 2 may be made from four pieces of magnetic material 105A, 105B and 106, such as permalloy. Nine "L" elements 202 are each overlayed by a "C" element 201 to allow room for prewound coils 204 to be slipped in place over the bottom leg of each "C" element. Corresponding "C" elements and "L" elements may then be welded together prior to assembling the head together.

Figure 3:
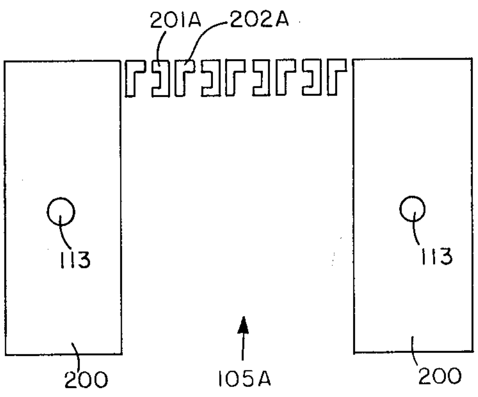
FIGS. 3 and 4 are plan views of typical head layers.
Figure 4:
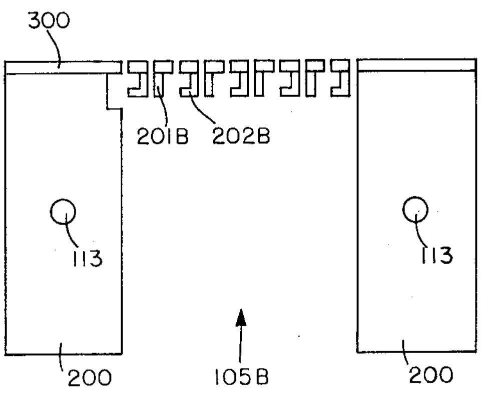

Referring now to FIGS. 3 and 4, the shapes of the layers 105A and 105B are shown in more detail to illustrate their construction and the formation of the write gaps 203. The same construction and principles apply to the read layers 106. As can be seen, the layers 105A and 105B are shaped to provide supports 200 having aligning holes 113, a series of "C" elements 201A and 202B and "L" elements 202A and 201B. A gap material 300 is associated with the top of the supports 200 and the top legs of all the elements of layer 105B. This gap material is provided as a separator between the layers 105A and 105B to form write gaps 203, but the method of application is not critical. That is, the gap material 300 may be applied by evaporation or deposition to either or both of the layers 105A and 105B, or it may be bonded thereon, laid thereon, etc. Typical gap material will be given below. The layers 105A and 105B may be constructed of any material having a high permeability, such a molybdenum nickel-iron-alloys, of which Hy-Mu 80 and Hy-Mu 800 are typical. Since, as will be explained hereinafter, the layers may be formed by electrical-discharge machining, etching, electron beam machining or similar techniques, they may be very thin. In the particular embodiment described herein, the thickness of the material is 14 mils for layers 105A and 105B and 10 mils for layers 106.

Figures 5, 6, 7:
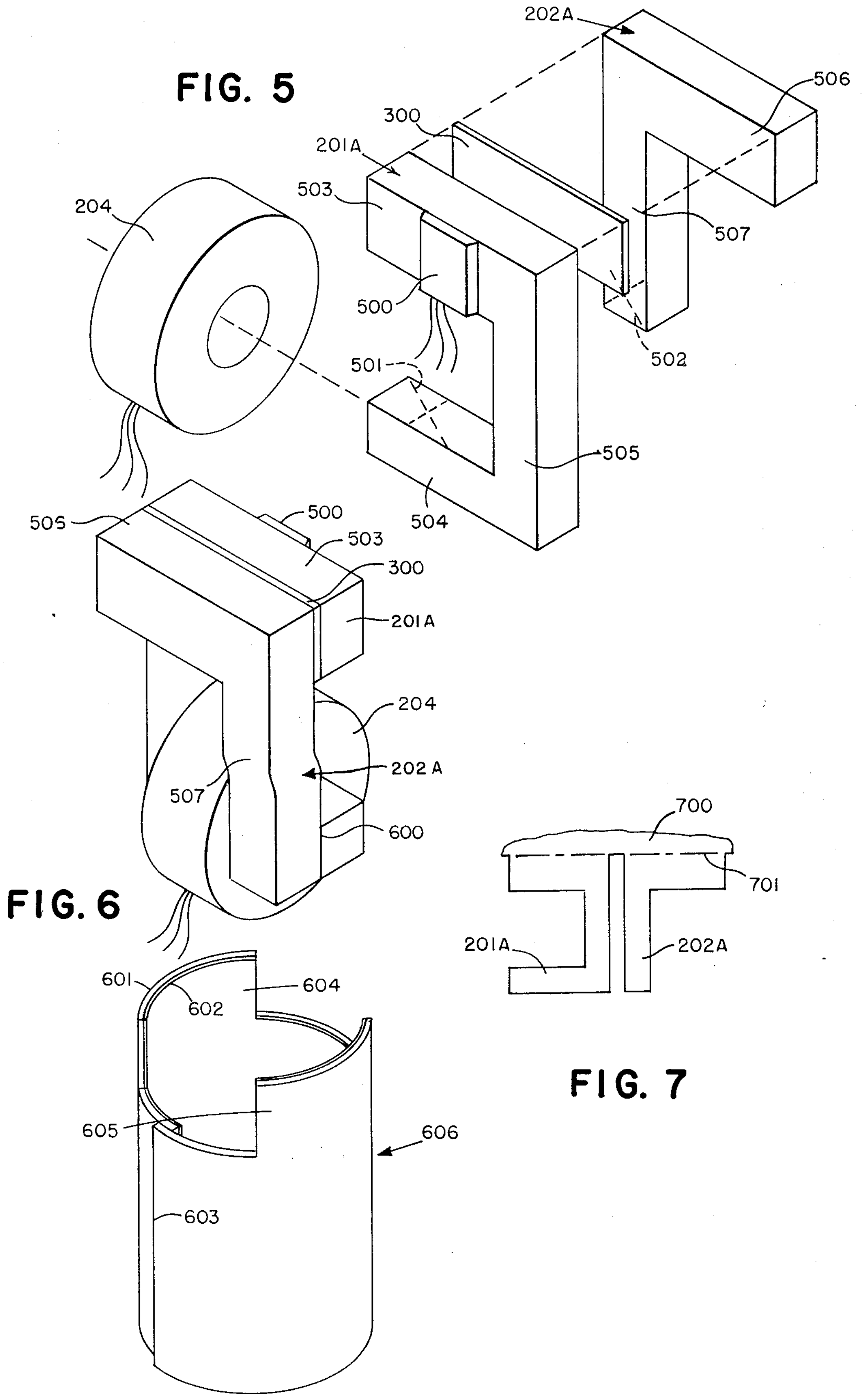
FIG. 5 is a detailed view of a head element including a winding.
FIG. 6 is a backward view of the head element showing the positioning of a shielding can on the element and winding of FIG. 5.
FIGS. 7 and 8 show details useful in the manufacture of layers.

The assembly of typical elements 201A and 202A, and the formation of the write gap by gap material 300, is shown in FIG. 5. The "C" element 201A comprises an upper leg 503, a bottom leg 504, and a side leg 505. The "L" element 202A comprises a top leg 506 and a side leg 507. The gap material 300 is sandwiched between the top legs 503 and 506, and the bottom leg 504 and side leg 507 are internally welded at points 501 and 502. Prior to assembly and welding, the winding 204 is placed over the bottom leg 504. A circuit 500 may be affixed, or otherwise associated with the top leg 503 or any other point convenient to wires from the winding 204. The circuit 500 may include an amplifier, a transformer, etc., thus providing circuits at a point enhancing the signal-to-noise ratio of the element.

The gap formed by the gap material 300 directs flux for writing and, in the case of a read gap, leads the reading flux through the winding. The usual method of construction provides a seam, such as the gap material 300, of an appropriate thickness between the two elements 201A and 202A forming a head element. The seam is usually made of some non-magnetic alloy, such as high strength cobalt based alloy having, for example, the approximate composition 42Co—20Cr—16Fe—15Ni—7Mo. Other techniques, each having many variations, are equally possible. A film may, for example, be vacuum deposited or sputtered on one or both of the elements 201A and 202A; silicon monoxide being a typical material for this purpose. In some cases, if the elements 201A and 202A were shaped by a photoetching technique, the gap may be formed by leaving photoresist on the desired gap area and then baking the material to harden it. It is also possible to form the gap material 300 by electroplating or electrolessly plating the layer. In still another technique, an oxide layer may be built up on the face of the lamination near the gap by oxidizing the gap area in a controlled atmosphere for a predetermined time. It is also possible to obtain the required seam thickness by spinning and drying a suspension of silicon dioxide or similar material on the lamination. A typical thickness for the gap material is 100 microinches.

The winding 204 has a number of turns determined by the desired output and input signal levels and the tape speed. For example, during reading, if an output of 6 millivolts is desired and the tape moves at 37.5 inches per second, the winding 204 will consist of 250 turns of 50 AWG wire. The number of turns may be greatly reduced by the use of a transformer in circuit 500 or elsewhere. The transformer raises the signal from a smaller number of turns to a higher voltage level and has several advantages over the use of a high-grain amplifier which also may be mounted in the position of circuit 500 or elsewhere. The transformer is normally less expensive than an amplifier, does not drift, does not require a special power source, can be adapted to floating, balanced center-tapped and single-ended circuits, can be matched to any circuit, and has a stable gain. Desired operation can be obtained by any transformer capable of matching a low impedance source, for example, three ohms to a high impedance load of 10,000 ohms. The transformer should give negligible phase shift at all frequencies between 1 kHz and 60 KHz and an effective voltage gain of about 30. If a separate transformer is mounted in the vicinity of the head, an acceptable transformer is model *DO*-T6 available from the United Transformer Company.

FIG. 6 shows the back of the element of FIG. 5 assembled and ready to receive a screening can 606. A backgap 600 is formed by the internal weld previously described with reference to FIG. 5. The screening can 606 is slipped over each assembled element in the magnetic head. The shields may be manufactured, for example, from two mil stock of molybdenum permalloy (75 mils wide) which is appropriately annealed, insulated, and wound around a 45 mil diameter mandrel for writing elements and 41 mil diameter mandrel for reading elements. Annealing is accomplished between pieces of ceramic cloth at 900°–950°C in a vacuum of $5 \times 10^{-5}$ to $5 \times 10^{-6}$ torr for 1 to 2 hours, followed by an appropriate cooling rate. Subsequently, a 15 mil wide strip of 1 mil thick polyester film may be glued to the inside surface of the molybdenum permalloy to eliminate the possibility of electrical shorts between the windings 204 and the screening can 606. The shielding strip is then wound around the mandrel to allow a 10 mil overlap at which joint solder is applied. Tabs 604 and 605 may be formed by cutting or grinding to extend between the tracks on the finished head and help in shielding around the gap 300.

The manufacture and assembly details of a head will now be described with particular reference to FIGS. 7 and 8. Layer 105A will be described as an example of all layers 105 and 106. The layer 105 is shaped from permalloy by manufacturing processes previously described to expose "C" element 201A and "L" element 202A supported at a future cut line by selvedge 700. The layers are then annealed between pieces of ceramic cloth at 900°–950°C in a vacuum of $5 \times 10^{-5}$ to $5 \times 10^{-6}$ torr for 1 to 2 hours. For example, typical annealing conditions are 900°C for 1 hour at $5 \times 10^{-6}$ torr with approximate heating and cooling rates of 1,000°C per hour to develop optimum magnetic and physical properties. This vacuum heat treatment removes stresses induced in permalloy by cold rolling and provides a clean, bright surface desirable for subsequent welding operations. The windings 204 are slipped over the bottom legs of the "C" elements 201A, as shown in FIG. 5, and the layers, of which layers 105A and 105B are typical, are fitted together. The two corresponding layers 105 and 106 are then welded together at the points 501 and 502, shown in FIG. 5, while the layers are held in alignment by a jig. Conventional fine-scale-support welding apparatus operating at a voltage of 1 to 2 volts for 2 milliseconds may be used. The selvedge 700 should also be spot welded at 1 to 2 volts for 12 milliseconds in order to maintain alignment after the laminations are removed from the jig. It is important to keep the areas welded free from contamination because the low voltages used during welding will not break down small insulating layers, thus creating differences in resistance which will give variable weld quality. The weld may, without affecting operation of the head, introduce an equivalent air gap of as much as five microinches. The screening cans 606 may now be slipped over the elements, as shown in FIG. 6, and the completed write and read sections placed adjacent their appropriate housings 107 and 108 on either side of the center section shield 109, as shown in FIG. 1A. Aligning dowel bolts 112 are placed in aligning holes 113 and electrical connections from the windings 204, or from the circuits 500, are brought to connection pins (not shown) and soldered. Voids in the head are filled with a solidifying agent, such as epoxy. After the epoxy is oven-cured, the selvedge 700 is cut off, the top of the head is dressed, ground and lapped to the required contour.

Figures 8, 9:
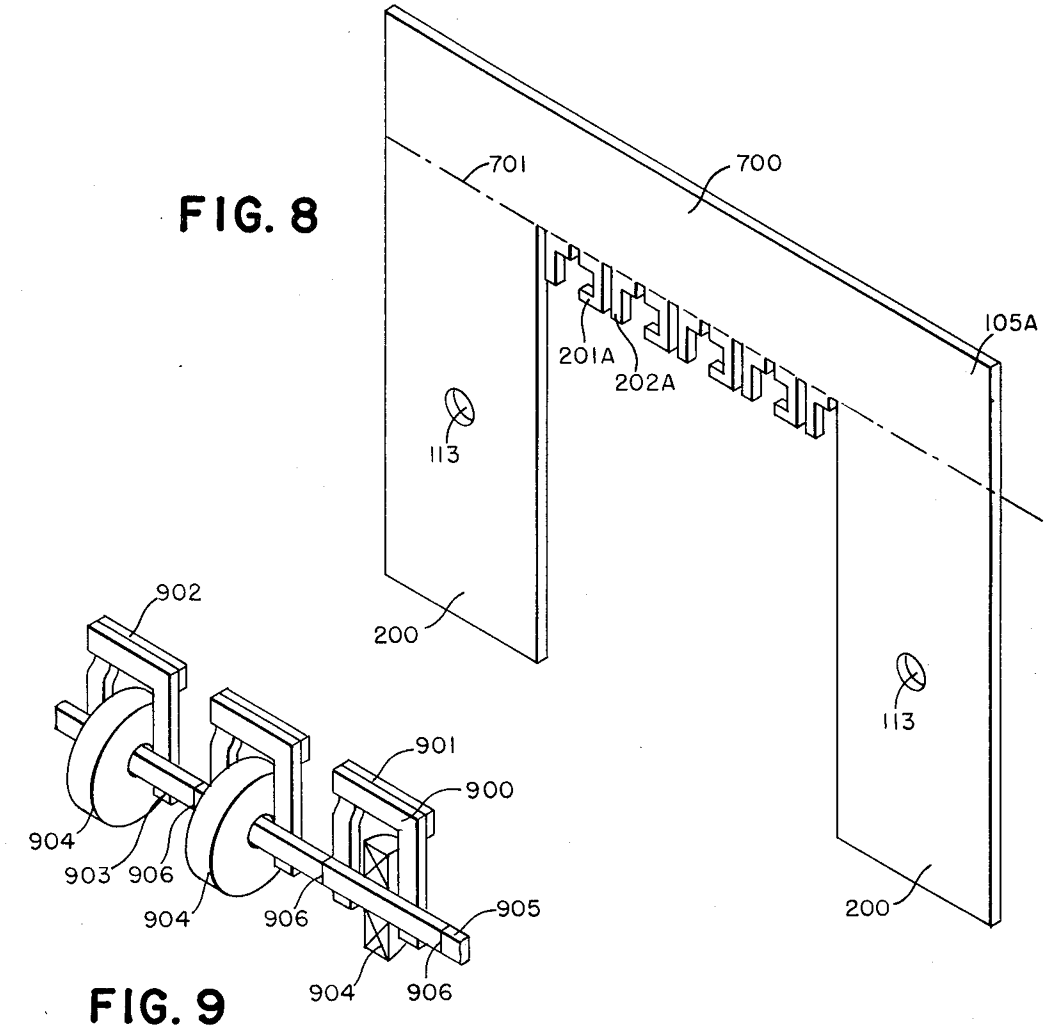
FIGS. 9 and 10 show additional embodiments of the invention.

An alternative means of assembling the windings in the head is shown in FIG. 9. It will be understood that the method of manufacturing layers and assembling the head is otherwise similar to that just described. In place of "C" elements and "L" elements, just described, "L" elements 901 and "L" elements 900 define gaps 902. A bar 905 connects the "L" elements 901 to the "L" elements 900, forms the backgaps 903, and also carries the windings 904. The separate head elements formed by pairs of "L" elements may be isolated from each other, subsequent to the mounting of the bar 905, by cutting the bar at points 906. Alternatively, the bar 905 may comprise a composite material alternately magnetic and, at or near points 906, non-magnetic. The bar simplifies the mounting of the windings 904 inasmuch as all of the windings 904 may be slipped or wound on the bar 905 and the bar then placed in position in the head.

Figure 10:
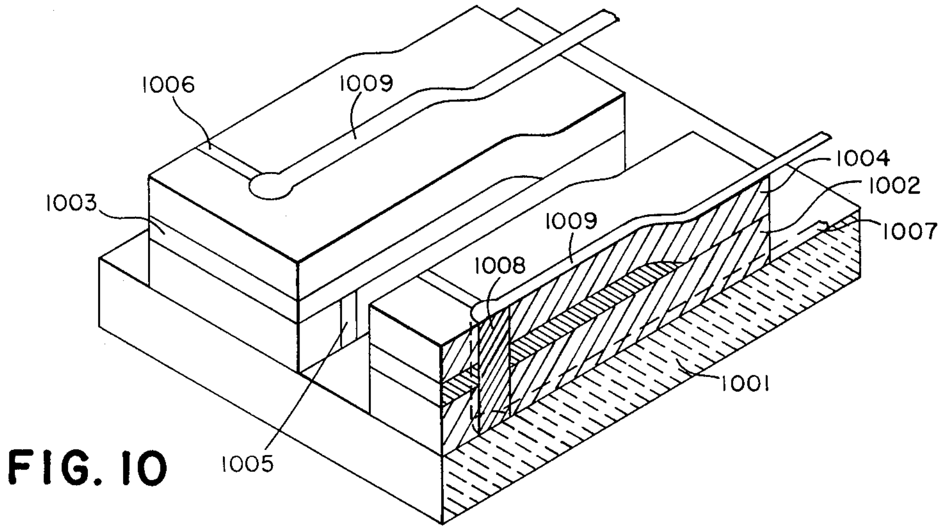

While the embodiments described to this point disclose the use of self-supporting layers, it is considered within the scope of this invention to form the head using any of a number of thin film techniques wherein material is evaporated, plated, deposited, etc. on a supporting substrate. Referring to FIG. 10, an example of a thin film embodiment of the invention is shown. Two elements, which may be a read or write element of a nine-track magnetic head similar to the ones shown in FIGS. 1A and 1B, are shown. The magnetic gap 1003 is formed by overlapping magnetic (for example, permalloy) thin film layers 1002 and 1004. A conductor formed by portions 1007, 1008 and 1009 passes through the layers at a 90° angle to the gap forming a winding around a line parallel to the gap. The element is built up on an insulating substrate 1001 made of a material, such as ceramic, glass, or oxidized silicon. A conductive material may be used, but an additional layer of insulation will be required between the substrate 1001 and the winding conductor portion 1007. Slots 1005 and 1006 are cut in each film 1002 and 1004, respectively, from the edge to the winding conductor comprising sections 1007, 1008, 1009 to ensure that magnetic flux generated by current in the conductor crosses the gap to produce an external recording field, during writing, and guiding the tape flux around the conductor, during reading. The magnetic circuit is closed at the point at which the films 1002 and 1004 meet.

The entire element consists of eight layers, each of which may be defined by a photoresist process. The metallic layers 1007 and 1009 may be deposited in a vacuum or plated by either electrolytic or electroless processes. The conductor section 1008 occupies a hole filled by an electroless or similar process. The details of one practical fabrication process will now be described.

| | |
|---|---|
| Step 1 | Plate substrate 1001 with copper. |
| Steps 2–8 | Use photoresist operations to define the lower conductor 1007. This sequence consists of coating with photoresist, drying, exposing through the appropriate mask, developing, backing, etching and stripping. |
| Step 9 | Vacuum deposit SiO insulating layer. |
| Step 10 | Plate with Ni-Fe alloy. |
| Steps 11–17 | Use photoresist to define the lower element of the magnetic circuit 1002, including the slot 1005. |
| Step 18 | Deposit the gap material 1003. |
| Steps 19–25 | Use photoresist to define the gap, including the hole. |
| Step 26 | Plate with Ni-Fe alloy. |
| Steps 27–23 | Use photoresist to define the upper element of the magnetic circuit 1004, including the slot 1006. |
| Step 34 | Vacuum deposit SiO insulating layer. |
| Steps 35–41 | Use photoresist to open holes and expose the lower contact land by etching through both oxide layers. |
| Step 42 | Plate the upper conductor 1009 and inside of the hole to contact the lower conductor 1007. This will double the thickness of the lower contact land. |
| Steps 43–49 | Use photoresist to define the upper conductor and the contact lands. |
| Step 50 | Vacuum deposit SiO insulating layer. |
| Steps 51–57 | Use photoresist to expose both contact lands. |

The various embodiments of magnetic heads described above may incorporate a variety of features intended to improve its performance. For example, the layers, including center shield and housing laminations may be oxidized to produce a surface film serving to insulate the laminations from one another and thus reduce eddy currents. If the laminations are in the range from 0.5 to 2 mils and the material is oxidized at 427°C for 1 hour in a recirculating air oven, an oxide film approximately 15 microinches thick will be formed. It will be noted that since all tracks of the head are cut from the same piece of material, there is no accumulation of track position tolerances, making the head particularly appropriate for batch fabrication. Due to the small dimensions, wear reducing plating of the head is simplified.

It will be understood that references herein to overlapped gaps and the like mean gaps between magnetic members in which members the magnetic flux flows in more than one plane.

While the invention has been particularly shown and described with reference to preferred embodiments thereof, it will be understood by those skilled in the art that various changes in form and details may be made therein without departing from the spirit and scope of the invention.

What is claimed is:

1. A plural channel magnetic head assembly including, for each channel, a magnetic flux circuit, an electric winding, and an overlapped gap, comprising:

a first continuous surface, in one plane, defining a plurality of seperable first magnetic flux circuit portions;

a second continuous surface, in another plane separate from said first surface, designed to be placed in juxtaposition with said first surface, defining a plurality of separable second magnetic flux circuit portions defining the overlapped read/write gaps, said gaps completing the magnetic circuit for flux in the planes of the first and second surfaces respectively;

a plurality of preformed windings, each winding associated with a magnetic circuit formed from the first and second portions by the juxtaposition of the first and second surfaces; and means for retaining the magnetic circuits and windings in position.

2. The plural channel magnetic head assembly of Claim 1, wherein the windings are carried on a member connecting said first and second portions to form said magnetic circuits.

3. The head assembly as defined in claim 2, wherein the member comprises a composite material having magnetic sections for completing magnetic circuits and non-magnetic sections for isolating the magnetic circuits from each other.

4. A plural gap magnetic head, wherein all gaps of a write section are in one plane and all gaps of a read section are in another plane, comprising:

mated lamina pairs forming separate magnetic paths and gaps, and carrying windings the axes of which are parallel to the gap plane for each of n channels, each mated lamina pair including:

1. a first lamina defining, in an initial state, m winding carriers interspersed by n-m magnetic circuit-closing legs, each carrier and leg having a gap-forming portion for mating with an opposing leg and carrier of another lamina;
2. a second lamina defining, in an initial state, *n–m* winding carriers interspersed by m magnetic circuit-closing legs, each carrier and leg having a gap-forming portion;

a gap-forming lamina for placement between the gap-forming portions of the first and second laminae to form m gaps, defined by the gap-forming portions of mated carriers and legs;

means for connecting together each of the mated carriers with their opposing legs to complete each magnetic circuit.

5. The plural channel magnetic head of claim 4, wherein each winding is surrounded by a magnetic shielding cylinder.

6. The plural channel magnetic head of claim 4, wherein shielding means are mounted between mated lamina pairs for magnetically isolating the pairs.

7. The plural channel magnetic head of claim 4, wherein:

each winding is surrounded by a magnetic shielding cylinder;

shielding plates are mounted between mated lamina pairs; and support means connect the lamina pairs and shielding plates to structurally fasten them to each other.

8. A transducer assembly for reading and writing via magnetic gaps electric signals as a plurality of tracks of magnetic indicia on a recording medium in motion relative to said gaps, comprising:

two sheets of magnetic material having an active head element middle section, supporting side sections, and a removable temporary supporting top section;

one plural-legged appendage for each track forming the middle section of each sheet, two appendages forming a head element for one track when the sheets are mated;

a winding placed on one leg of one of the appendages for each track;

a non-magnetic material in contact with a portion of all the appendages on one sheet to define a magnetic gap when the sheets are mated;

a fastening contact connecting each two mated appendages for completing a magnetic circuit when the sheets are mated; and filling means for penetrating the interstices of the sheets to form a single physical entity of the mated sheets to facilitate removal of the top section and exposure of the gaps.

9. The transducer assembly of Claim 8, wherein shielding material surrounds said coils.

10. The method of forming a high-density multiple-track magnetic head, including the steps of:

forming a first sheet of magnetic material carrying alternate three-section and two-section circuit portions arranged in a line;

forming a second sheet of magnetic material, complementary to said first sheet so that juxtaposition of one three-section portion from one sheet and one two-section portion from the other sheet forms a closed magnetic circuit, with one section overlapping;

applying a separating material to the overlapping sections of both portions of the first sheet to permit the establishment of a magnetic gap;

slipping a winding over one section of each of the three-section circuit portions on both sheets;

juxtaposing the two sheets to mate complementary portions and form magnetic circuits, each having a winding and a gap;

fastening the complementary portions together to form a complete single-gap magnetic circuit;

fixing the sheets in a predetermined position mechanically; and removing excess sheet material to expose the gap for utilization.

* * * * *